March 31, 1970     H. H. BEEMAN     3,503,392
DRESSING SUPPORT

Filed Oct. 17, 1967     2 Sheets-Sheet 1

INVENTOR/S

HARRIET HOWES BEEMAN,

BY *Melville, Strasser, Foster and Hoffman*
ATTORNEYS

March 31, 1970     H. H. BEEMAN     3,503,392
DRESSING SUPPORT
Filed Oct. 17, 1967     2 Sheets-Sheet 2
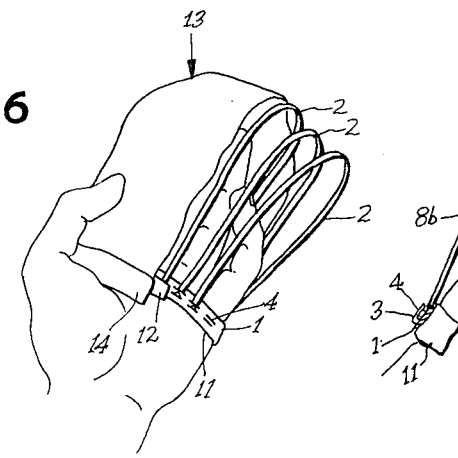
Fig. 6
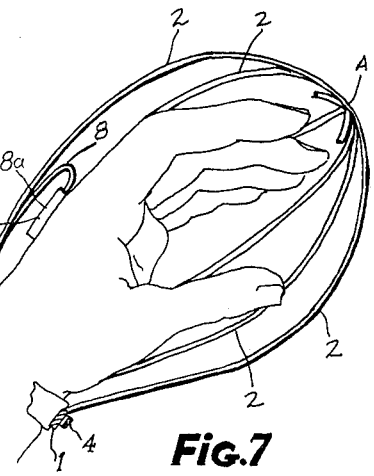
Fig. 7
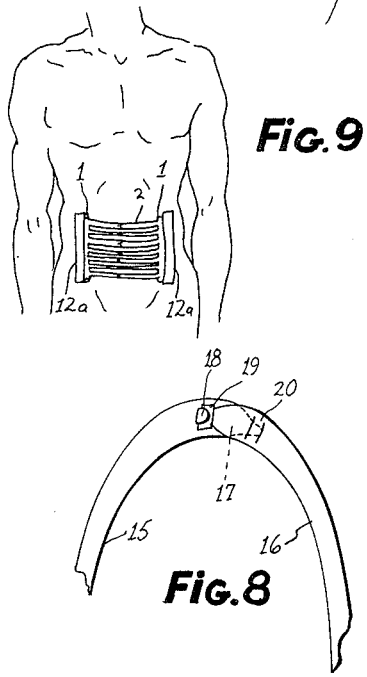
Fig. 9
Fig. 8
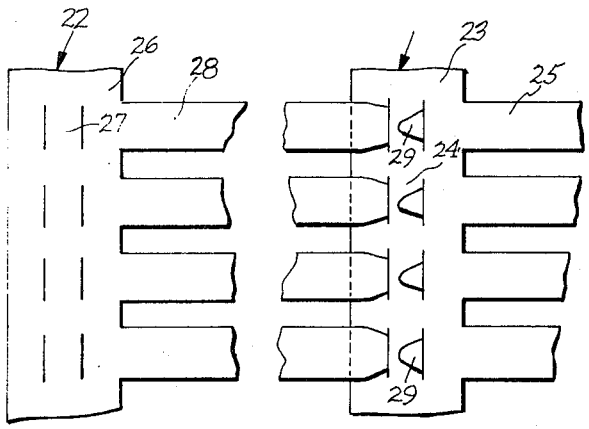
Fig. 10
INVENTOR/S
HARRIET HOWES BEEMAN,
BY *Melville, Strasser, Foster and Hoffman*
ATTORNEYS United States Patent Office 3,503,392
Patented Mar. 31, 1970

3,503,392
DRESSING SUPPORT
Harriet Howes Beeman, 4034 Montgomery Road,
Cincinnati, Ohio 45212
Filed Oct. 17, 1967, Ser. No. 675,908
Int. Cl. A61f 13/00
U.S. Cl. 128—132                    8 Claims

ABSTRACT OF THE DISCLOSURE

A support for maintaining dressings and the like in spaced relationship to a wound. The support comprises a band having a plurality of slots extending longitudinally thereof and a plurality of lateral extensions or fingers extending from one side thereof. The band may be affixed to or wrapped about a portion of the patient's body near the wound, and selected ones of the extensions or fingers may be bent over the wound with their free ends engaged in selected ones of the slots in the band, whereby to form a cage-like support over the wound to which dressings may be applied.

BACKGROUND OF THE INVENTION

Field of invention

The invention relates to a dressing support, and more particularly to an adjustable support means for maintaining dressings and the like in spaced relationship to a wound.

DESCRIPTION OF THE PRIOR ART

There are a number of diseases of the skin, burns, wounds and the like which are of such nature that while covering dressings are required, it is preferable that the dressings not be in direct contact with the affected area. For example, after proper treatment of a burned area, or after hemostasis in an instance of amputation, covering dressings should be applied to prevent infection in the affected area. Heretofore, dressings have been applied directly to the affected area. Often, however, such dressings become adhered to the affected area and removal of the dressings frequently result in a tearing or reopening of the wound. This, in turn, not only constitutes a source of discomfort for the patient, but also tends to inhibit the healing process and to increase the chances of infection.

Heretofore, physicians have sometimes improvised make-shift bandage supports for the maintaining of dressings in spaced relationship to a wound, but supports applicable to substantially any part of the body for the protection of many types of injuries have not been available.

In accordance with the teachings of the present invention, a bandage or dressing support is provided which is capable of being suitably configured for use on substantially any portion of the body. The support will maintain dressings away from amputated members, burned areas and the like, and will prevent the adhering of dressings to the affected area. The dressing support of the present invention will permit observation of the affected areas without complete removal of the dressings, and may readily be cut and configured to any suitable size and shape. In instances where large areas of the body are affected, two or more of the bandage supports of the present invention may be joined together to constitute a single large support.

SUMMARY OF THE INVENTION

The support of the present invention, for maintaining a bandage or dressing in spaced relationship to a wound or affected area of the body, comprises a band of flexible material having a plurality of lateral extensions or fingers. The band has a plurality of slots extending longitudinally thereof. Each slot is located adjacent the base of a finger or extension. One end of the band has a slot. The other end of the band has a tab, adapted to engage the last mentioned slot.

When the support is to be used in connection, for example, with a scalp wound, a portion of the patient's head having been injured or denuded, the band of the support may be wrapped about the injured head over a protective band of gauze or the like. The tab at one end of the band is engaged in the slot at the other end of the band to hold the band in place. Selected ones of the extensions are bent over the injured portion of the head, in spaced realtionship thereto, and the free ends of the extensions are engaged in appropriate ones of the longitudinal slots in the band. Those extensions not used may simply be severed from the band. In its final form, the support comprises a cage-like means about the wound to which appropriate dressings may be applied and by which the dressings will be maintained in spaced relationship to the wound.

In one embodiment of the invention, additional extensions between the fingers may be provided on the band. These extensions may be bent inwardly in such a way that the ends thereof (which may be wrapped with tape) contact unaffected areas of the body portion to be protected so as to maintain the cage-like structure in its proper spaced position about the wound.

When the dressing support of the present invention is used to protect burns or wounds on large portions of the body, the support may be appropriately configured and affixed to unaffected portions of the body by adhesive tape or the like. Two or more of the supports of the present invention may be joined to form a larger support when necessary.

BRIEF DESCRIPTION OF THE DRAWINGS

FIG. 4 is a fragmentary perspective view of the support of the present invention in its fully formed condition.

FIG. 6 is a fragmentary elevational view partly in cross section illustrating the application of the support of the present invention to a hand having a plurality of injured fingers.

FIG. 7 is an elevational view of the support, partly in cross section, illustrating its application to a hand in such a way as to cover the entire hand.

FIG. 8 is a perspective fragmentary view illustrating the joining of the free ends of a pair of extensions.

FIG. 9 is a fragmentary perspective view illustrating the application of two of the supports of the present invention to a large area of a patient's body.

FIG. 10 is a fragmentary plan view illustrating the joining together of two supports of the present invention.

DESCRIPTION OF THE PREFERRED EMBODIMENTS

Figure 1:
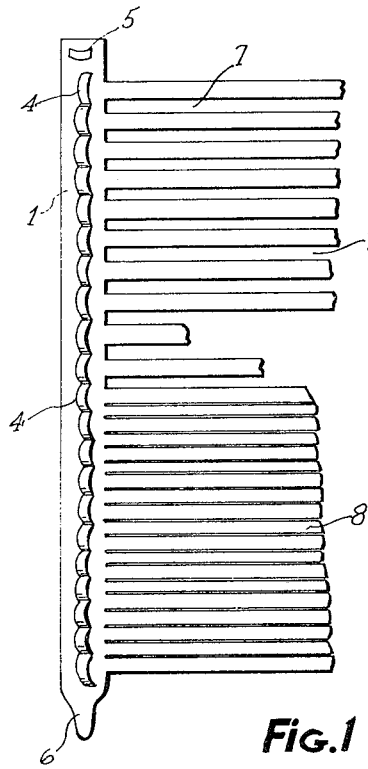
FIG. 1 is a plan view of the support of the present invention illustrating the slotted band and lateral extensions in their flattened position.

FIG. 1 illustrates the support of the present invention in its flattened position. As shown, the support comprises a band 1 having a plurality of lateral extensions or fingers 2. The free ends of the fingers 2 are tapered as at 3.

The band 1 has a plurality of slots 4 extending longitudinally thereof. Each of the slots 4 is located adjacent the base of a finger 2. An additional transverse slot 5 is provided at one end of the band, while the other end of the band is tapered as indicated at 6.

While the fingers 2 may lie immediately adjacent each other, it is preferable that they be spaced from each other, as indicated at 7. It is also within the scope of the invention to provide shorter extensions between the fingers 2. Such shorter extensions are illustrated at 8, and will be more fully described hereinafter.

The support of the present invention may be made of any suitable material such as metal, plastic or the like. The material from which the support is made should be bendable, and of sufficient strength to support bandages or dressings applied thereto.

Figure 2:
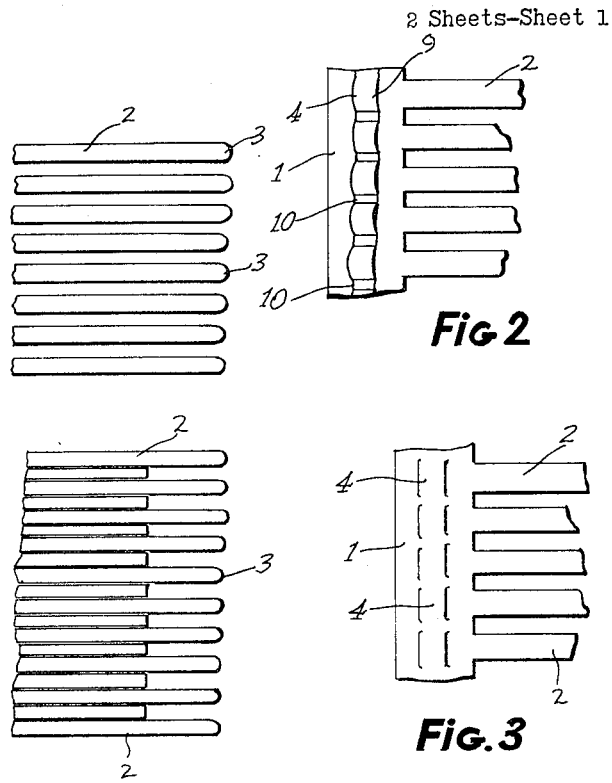
FIG. 2 is a fragmentary view illustrating longitudinally extending slots formed on the band by a separate strip affixed thereto.

FIG. 2 is a fragmentary view of the support of the present invention illustrating an exemplary way of forming the slots 4 on the band 1. In this embodiment, the slots 4 are formed by a separate strip 9. Spaced portions 10 of the strip 9 are affixed to the band 1 in any suitable manner. Those parts of the strip 9 between the portions 10 form the slots 4.

Figure 3:
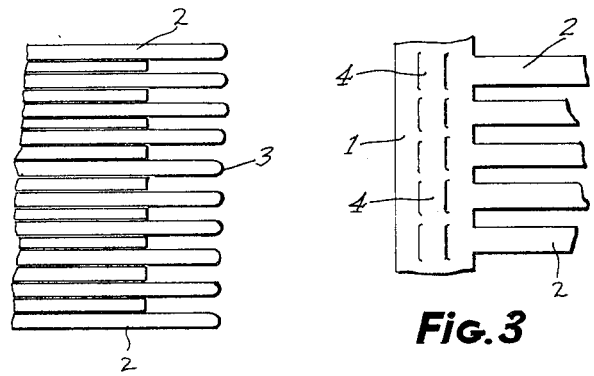

FIG. 3 is a view similar to FIG. 2 illustrating the slots 4 as integrally formed in the band 1. In this instance each slot 4 is formed by a pair of spaced perforations in the band 1. If desired, the portion between the spaced perforations may be slightly raised or upset from the plane of the band as illustrated.

Figure 4:
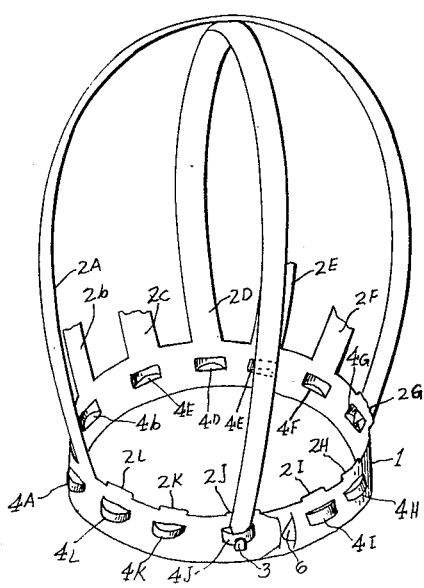
FIG. 4 is a fragmentary view, similar to FIG. 2, and illustrating longitudinally extending slots integrally formed in the band.

FIG. 4 is a fragmentary perspective view illustrating the support of the present invention in fully erected form. As shown, the ends of the band 1 are joined by inserting the tab 6 into the slot 5. The tab 6 is bent over so as to lock the ends of the band together.

For purposes of an exemplary showing, the band 1 is illustrated as having twelve fingers 2A–2L and twelve slots 4A–4L.

In order to form the support into its cage-like configuration, the finger 2A may be bent over with its free end engaged in the slot 4G. It will be noted that the slot 4G is substantially diametrically opposed to the base of the finger 2A. Similarly, the free end of the finger 2D may be engaged in the slot 4J. As indicated, after insertion into the slot 4J the tapered end 3 of the finger 2D may be bent over in order to provide a locking engagement. Additionally, the free ends of fingers 2B and 2C may be engaged in slots 4H and 4I respectively, and the free ends of fingers 2E and 2F may be engaged in slots 4K and 4L respectively.

It will be noted that fingers 2G–2L will not be used, and may simply be severed from the band 1 by any suitable tool.

It will be understood by one skilled in the art that the length of the band 1 and the length of the fingers 2 do not constitute a limitation on the present invention. It is within the scope of the invention to provide the support in various sizes. In a given instance, if the band 1 is longer than required by the body portion to which it is to be affixed, the band may simply be cut by an appropriate tool, the cut end being tapered to form the tab 6. Similarly, any of the fingers 2 not being used may be severed from the band and, when necessary, the fingers 2 may be shortened by cutting with a suitable tool and tapering the free ends thereof to facilitate insertion in appropriate ones of the slots 4.

Figure 5:
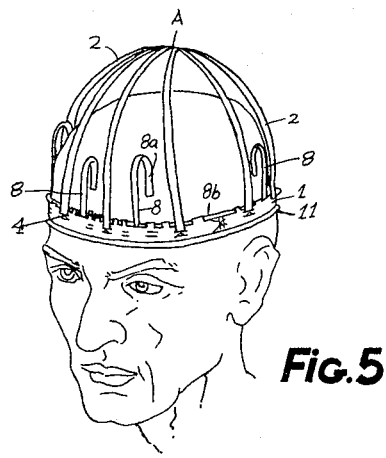
FIG. 5 is a perspective view of the support as applied to a patient's head.

FIG. 5 illustrates an exemplary application of the support of the present invention to the head of a patient having suffered a scalp wound. The band 1 is wrapped about the head and has its ends joined as described with respect to FIG. 4. In some instances, it may be desirable to provide a protective or cushioning bandage 11 beneath the band 1. The band, if desired, may further be secured to the patient's head by adhesive tape or the like (not shown).

As described with respect to FIG. 4, selected ones of the fingers or extensions 2 are bent over the affected area and their free ends are affixed in appropriate ones of the band slots 4.

When the support has been properly positioned as illustrated, an appropriate dressing (not shown) may be applied thereto. It will be evident that the dressing will protect the affected portion of the head from infection and the like, but will not contact the affected portion. The dressing may be periodically removed for inspection and treatment of the wound without aggravation to the wound. Many types of treatments may be applied to the wound without removal of the support.

Where the type and location of the wound permit, additional means may be used to maintain the support in its proper position about the wounded area.

When an embodiment of the support having the shorter extensions 8 is used, selected ones of the extensions 8 may have their ends 8a bent over in such a way as to contact unaffected portions of the head so as to maintain the proper spacing of the support from the affected area. When desired, the bent over ends of the extensions 8a may be provided with a layer of tape 8b or the like to prevent irritation of that portion of the patient's head contacted by them. The selected ones of the extensions 8 which are used as spacing means may be cut to any desired length. Those of the extensions 8 which are not used may be severed from the band 1.

It will further be understood by one skilled in the art that in embodiments of the support of the present invention, not provided with the shorter extensions 8, unused ones of the fingers 2 may be cut and configured to serve the same purpose.

The application of the bandage or dressing support of the present invention to head and scalp wounds is particularly advantageous. Heretofore, the patient's hair constituted a great problem in bandaging a scalp wound. By the use of the support of the present invention, this problem has not only been considerably alleviated, but also the amount of hair required to be removed from the patient's head may be greatly reduced.

FIG. 6 illustrates an exemplary application of the support of the present invention to a patient's hand, the fingers of which have suffered from skin disease, injury, or the like. Again, like parts have been given like index numerals. In this instance, where all of the fingers are to be protected, a protective or cushioning bandage or the like may be wrapped about the hand, as indicated at 11. The band 1 of the support of the present invention is then wrapped about the hand, on top of the protective bandage 11, and the ends of the band are joined together (as described with respect to FIG. 4). Selected ones of the support fingers 2 are then bent over the ends of the injured fingers. The free ends of the extensions or fingers 2 are affixed in appropriate ones of the slots 4 in the band. In this way, a cage-like support is formed about the injured fingers. It will be understood that the support will be affixed to the hand after appropriate treatment of the wounded areas has been accomplished.

The support may be additionally held in its proper position on the patient's hand by means of adhesive tape or the like. As indicated at 12, tape may be placed about the patient's hand, a portion of the tape being adhered to the band 1.

With the support of the present invention properly configured and affixed to the patient's hand, the bandage or derssing may then be placed thereabout. For purposes of an exemplary showing, a dressing is generally indicated at 13, affixed about its lower end to the patient's hand by means of tape 14.

Again it will be noted that the outer dressing may be partially or completely removed without disturbing the patient's injury. Inspection of the wound may be made, and some types of treatment may be administered without the removal of the support.

FIG. 7 is similar to FIG. 5 and illustrates the application of the bandage support to an injured hand in such a way that the entire hand will be encompassed thereby. Like parts have been given like index numerals. In this instance, the band 1 of the support is wrapped about the wrist, preferably over a protective bandage 11. The band ends are joined together as described with respect to FIG. 4. Selected ones of the support fingers 2 are then configured about the hand and the free ends of the extensions or fingers are affixed in appropriate ones of the slots 4 in the band.

The support having been located after treatment of the affected area, a bandage or dressing (not shown) may then be placed thereabout. Both the support and the bandage or dressing may be held in place by tape or suitable means extending around the patient's wrist. As illustrated in FIG. 7, selected ones of extensions 8 may be properly configured to maintain the support in its proper position about the hand.

In some instances the lateral extensions or fingers of the support may not be of sufficient length to permit the insertion of the free ends thereof in the slots 4 of the band. It is within the scope of the present invention to provide the free end of each finger with a slot similar to the slots 4 of the band, so that the free ends of an appropriate pair of fingers may be joined together to form an arched support portion utilizing the full length of the joined fingers.

FIG. 8 illustrates a pair of fingers 15 and 16 similar to the fingers 2 in FIG 1. The fingers 15 and 16 are provided with tapered ends 17 and 18 respectively. The finger 15 has at its free end a slot 19. Similarly, the fingers 16 has a slot 20. The slots 19 and 20 may be formed in any suitable manner including the ways set forth with respect to the slots 4 of FIGS. 2 and 3.

As illustrated in FIG. 8, the free end 18 of the finger 16 may be inserted in the slot 19 of the finger 15 and locked in place by bending that portion of the end 18 which extends beyond the slot 19 back over the top of the slot 19. In this way, the fingers 15 and 16 are firmly joined together. Due to the tapered configuration of the free end 18, it cannot be withdrawn from the slot 19 until the bent over portion is returned to its original position. It will be understood by one skilled in the art that the free end 17 of the finger 15 could have been affixed in the slot 20 of the finger 16 in the same manner. Generally, it is merely a matter of choice as to which of the slots 19 and 20 is to be used.

It will be understood by one skilled in the art that in applications of the type illustrated in FIGS. 5 and 7, a bandage support having shorter fingers may be used. In such an instance, the free ends of the fingers may be joined as illustrated in FIG. 9. The free ends would be joined at the positions indicated at A in FIGS. 5 and 7.

The support of the present invention may also be used in instances where injury or disease is sustained on a large area of the body such as the chest, back, abdomen or the like. In such an instance, the support may be used substantially in its position illustrated in FIG. 1. The central portion of the fingers 2 may be slightly bowed, and the bowed portion caused to span the affected areas. Once in position, the band 4 and the tapered ends 3 of the fingers may be taped or otherwise affixed to the body adjacent the affected areas.

In certain instances it may be desired to join two or more supports to form a single large support. FIG. 9 illustrates two supports of the present invention joined together to span a large abdominal area. A protective bandage (not shown) may be located beneath the band 1 of each support, and the band may be held in place on the patient's body by tape or the like shown at 12a. The fingers 2 of both supports are slightly bowed so as to lie in spaced relationship to the affected area. The free ends of the fingers 2 are joined together in the manner illustrated in FIG. 8. All of the advantages of the support means, as described above with respect to FIGS. 5, 6 and 7, are thus achievable in connection with wounds sustained on large areas of the body.

Another method of joining a pair of supports together is illustrated in FIG. 10. A pair of supports similar to that shown in FIG. 1 are generally indicated at 21 and 22. The support 21 comprises a band 23 with longitudinal slots 24 and laterally extending fingers 25. Similarly, the support 22 comprises a band 26, longitudinally extending slots 27 and laterally extending fingers 28. The fingers 25 of the support 21 and the fingers 28 of the support 22 will terminate in tapered ends such as those shown at 3 in FIG. 1. The tapered ends of the fingers 28 of the support 22 are shown at 29.

As indicated in FIG. 10, the tapered ends 29 of the fingers of the support 22 may be inserted in the slots 24 in the band of the support 21. The ends 29 may then be doubled back over the top of the slots 24 to firmly affix the supports 21 and 22 together. It will be noted that the tapered configuration of the ends 29 of the fingers 28 will prevent their removal from the slots 24 unless the ends are returned to their original flat position, since the fingers 28 cannot move in either longitudinal direction within the slots 24.

It will be understood by one skilled in the art that two or more supports of the present invention may have their bands joined in endwise relationship to form a single large support. Referring to FIG. 1, it will be evident that the tab 6 of the band 1 may be inserted in the slot 5 of the band of an adjacent support and locked therein.

Thus, as described, a plurality of supports may be joined by the attachment of adjacent bands, adjacent fingers, or by the attachment of the fingers of one to the band of another. In this way, a support may be made having substantially any size or configuration.

Modifications may be made in the invention without departing from the spirit of it.

The embodiments of the invention in which an exclusive property or privilege is claimed are defined as follows:

1. A support for maintaining a bandage in spaced relationship to an injured area of a patient's body, said support comprising a flexible band, a plurality of flexible fingers extending laterally from one longitudinal edge of said band and terminating in free ends means along said band for joining the free ends of said fingers to said band at selected positions.

2. The structure claimed in claim 1 including means for joining the ends of said band together to form a continuous band.

3. The structure claimed in claim 2 wherein said means for joining the ends of said band comprises a transverse slot adjacent one end of said band, the other end of said band being so dimensioned as to be engagable in said slot.

4. The structure claimed in claim 1 wherein said means for joining the free ends of said fingers to said band comprises a plurality of slots extending in endwise relationship along said band, the free ends of said fingers being so dimensioned as to be engageable in said slots.

5. The structure claimed in claim 4 wherein said slots are equal in number to the number of said fingers, each of said slots being located adjacent the juncture of a finger and said lateral edge of said band.

6. A support for maintaining a bandage in spaced relationship to an injured area of a patient's body, said support comprising a flexible band, a plurality of flexible fingers extending laterally from one longitudinal edge of said band and terminating in free ends, means for joining the ends of said band together, said means comprising a transverse slot adjacent one end of said band, the other end of said band being so dimensioned as to be engagable in said transverse slot, means for joining the free ends of said fingers to said band at selected positions, said last mentioned means comprising a plurality of slots extending in endwise relationship along said band, the free ends of said fingers being so dimensioned as to be engagable in said slots, said support being formable into a cage-like configuration about said injured area.

7. The structure claimed in claim 6 including a plurality of flexible lateral extensions, one end of each extension being affixed to said longitudinal edge of said band, the other end of each extension being free, each of said extensions lying parallel to and between adjacent ones of said fingers, said extensions being bendable so as to form spacers contacting the patient's body about said injured area when said support is formed into said cage-like configuration whereby to maintain said support in proper position.

8. The structure claimed in claim 6 including means for joining the free ends of opposed parts of said fingers together when said support is formed into said cage-like configuration, said means comprising a transverse slot at the free end of each of said fingers, the free end of each of said fingers being so dimensioned as to be engagable in the slot of an opposed one of said fingers.

References Cited

UNITED STATES PATENTS

| 1,635,230 | 7/1927 | Spicer | 128—133 |
| 2,520,436 | 8/1950 | Russell | 128—132 |
| 2,767,709 | 10/1956 | Holland | 128—133 |

ADELE M. EAGER, Primary Examiner

U.S. Cl. X.R.

128—153, 157, 163